United States Patent
Hernandez-Oliver et al.

(10) Patent No.: US 10,036,658 B2
(45) Date of Patent: Jul. 31, 2018

(54) SENSOR ASSEMBLY

(71) Applicant: TYCO ELECTRONICS CORPORATION, Berwyn, PA (US)

(72) Inventors: Salvador Hernandez-Oliver, Kernersville, NC (US); James Larry Atkins, Jr., Winston Salem, NC (US); Christopher Couch, Troy, MI (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 419 days.

(21) Appl. No.: 14/832,623

(22) Filed: Aug. 21, 2015

(65) Prior Publication Data

US 2017/0052043 A1    Feb. 23, 2017

(51) Int. Cl.
*G01R 33/025*    (2006.01)
*G01D 11/24*    (2006.01)
*F16H 48/34*    (2012.01)
*G01D 5/20*    (2006.01)

(52) U.S. Cl.
CPC ........... *G01D 11/245* (2013.01); *F16H 48/34* (2013.01); *G01D 5/2006* (2013.01)

(58) Field of Classification Search
CPC ..... G01D 11/245; G01D 5/2006; F16H 48/34
See application file for complete search history.

(56) References Cited

U.S. PATENT DOCUMENTS

| 4,989,574 A | 2/1991 | Abe |
| 2004/0004474 A1 | 1/2004 | Kojima et al. |
| 2007/0270275 A1 | 11/2007 | Kleinhans et al. |
| 2008/0042791 A1 * | 2/2008 | York ........................ F16H 48/08 335/296 |
| 2009/0107253 A1 * | 4/2009 | Armas .................... G01F 1/075 73/861.78 |
| 2011/0101970 A1 | 5/2011 | Lanter |

FOREIGN PATENT DOCUMENTS

WO    WO 2009/080603    *    7/2009

OTHER PUBLICATIONS

International Search Report, International Application No. PCT/US2016/041865, International Filing Date Jul. 12, 2016.

* cited by examiner

*Primary Examiner* — Daniel Miller

(57) ABSTRACT

A sensor assembly includes a housing, a shield member, a magnetic field sensor, and a sensing magnet. The housing is configured to be mounted at least proximate to an electromagnetic coil that generates a first magnetic field to cause a movable component to move linearly along an axis based on the strength of the first magnetic field. The sensing magnet is configured to be coupled to the movable component to move therewith. The magnetic field sensor and the sensing magnet are disposed within a shielded chamber defined by the shield member, which is ferrous to shield the magnetic field sensor and sensing magnet from the first magnetic field. The magnetic field sensor detects an electrical characteristic responsive to a second magnetic field produced by the sensing magnet to monitor a position of the movable component along the axis.

20 Claims, 5 Drawing Sheets

SENSOR ASSEMBLY

BACKGROUND OF THE INVENTION

The subject matter herein relates generally to sensor assemblies that are used to detect the position of at least one movable component.

Some known devices use an electromagnetic coil to cause movement of another component of the device based on a magnetic field generated by the electromagnetic coil. Examples of such known devices include some vehicle differential systems and transmission clutch systems in vehicle applications. The differential system may be a locking differential or a limited slip differential, such that the electromagnetic coil generates a magnetic field to move a disk or ring, which may be rotating or stationary, axially relative to the coil. The disk may be used in a locking differential to lock two wheels attached to the same axle such that the two wheels rotate at the same velocities. The disk alternatively may be used in a limited slip differential that allows the wheels of the same axle to rotate at different velocities while individually controlling the torque applied to each of the two wheels. It may be desirable to track the axial position of the disk relative to the electromagnetic coil, as such data may be used to determine or verify whether the disk is engaged with a locking gear of the differential system that engages the disk or is disengaged from the locking gear at particular times. The data on the position of the disk may also be useful in determining whether maintenance is suggested or necessary, as wear on the disk, the locking gear, or another component may affect the extent of the movement of the disk and the stopping positions of the disk responsive to the magnetic field.

Sensors are often used to track positions of movable components. The sensors must be compact to fit within a casing of the respective device in order to monitor the movement of the moveable component. Although contactless magnetic sensors are generally reliable, such magnetic sensors function based on a sensor magnetic field and are prone to errors and inaccuracies due to magnetic field interference. For example, the coil magnetic field generated by the electromagnetic coil would interfere with a typical magnetic sensor that is located within the coil magnetic field by producing noise that makes it difficult for the sensor to distinguish detected magnetic flux attributable to the sensor magnetic field from magnetic flux attributable to the coil magnetic field, leading to inaccuracies. Moving the magnetic sensor farther away from the electromagnetic coil to reduce the noise from the coil magnetic field in the detected signal may not be practical due to space constraints.

A need remains for a position sensing system that improves the accuracy of position sensing by reducing the effect of an external magnetic field.

BRIEF DESCRIPTION OF THE INVENTION

In an embodiment, a sensor assembly is disclosed that includes a housing, a shield member, a sensing magnet, and a magnetic field sensor. The housing extends between a front and a rear. The housing is configured to be mounted at least one of on or proximate to an electromagnetic coil configured to generate a first magnetic field to move a movable component linearly along an axis between an advanced position and a retracted position relative to the electromagnetic coil based on a strength of the first magnetic field. The shield member is disposed within the housing. The shield member defines a shielded chamber. The sensing magnet is configured to be coupled to the movable component such that the sensing magnet moves with the movable component. The sensing magnet is disposed within the shielded chamber. The magnetic field sensor is disposed within the shielded chamber. The magnetic field sensor detects an electrical characteristic responsive to a second magnetic field produced by the sensing magnet to monitor a position of the movable component along the axis. The shield member is composed of a ferrous material to shield the magnetic field sensor and the sensing magnet from the first magnetic field generated by the electromagnetic coil.

In another embodiment, a position sensing system is disclosed that includes an electromagnetic lock assembly and a sensor assembly mounted on or proximate to the electromagnetic lock assembly. The electromagnetic lock assembly includes an electromagnetic coil and a locking ring. The electromagnetic coil is configured to receive a current to generate a first magnetic field. The locking ring moves linearly along a locking axis between an advanced position and a retracted position relative to the electromagnetic coil based on a strength of the first magnetic field. The sensor assembly includes a shield member, a magnetic field sensor, and a sensing magnet. The sensing magnet is coupled to the locking ring and movable with the movement of the locking ring. The shield member defines a shielded chamber. The magnetic field sensor and the sensing magnet are disposed within the shielded chamber. The magnetic field sensor detects an electrical characteristic responsive to a second magnetic field produced by the sensing magnet to monitor a position of the locking ring along the locking axis. The shield member is composed of a ferrous material to shield the magnetic field sensor and the sensing magnet from the first magnetic field generated by the electromagnetic coil.

DETAILED DESCRIPTION OF THE INVENTION

Figure 1:
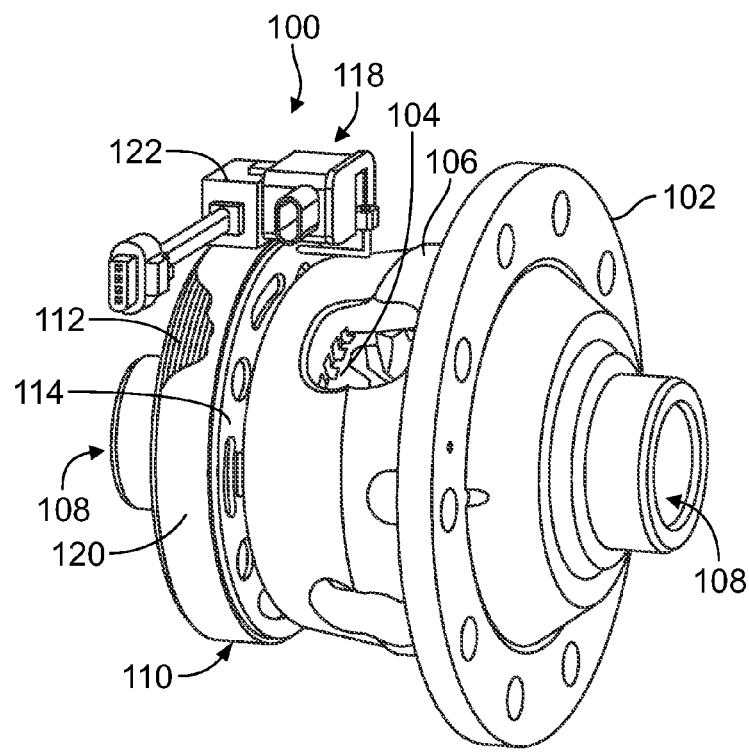
FIG. 1 is a left perspective view of a position sensing system on a mechanical device according to an embodiment.

FIG. 1 is a left perspective view of a position sensing system 100 on a mechanical device 102 according to an embodiment. The position sensing system 100 may be used in various vehicular and industrial applications to detect a position of a movable component of the mechanical device 102, such as a component that moves linearly along a set path. As one non-limiting example shown in FIG. 1, the mechanical device 102 is a differential system 102 of a vehicle, such as an automobile or truck. The differential system 102 includes multiple gears 104 (shown in more detail in FIG. 2) and a case 106 that surrounds the gears 104. The differential system 102 also defines two bores 108 that receive respective shafts (not shown) therein for coupling the differential system 102 to corresponding wheels (not shown).

In an embodiment, the differential system 102 is a locking differential, a limited slip differential, or another type of differential that is not a simple open differential. The differential system 102 includes an electromagnetic lock assembly 110 that is configured to selectively control the configuration of the differential system 102 in order to control the distribution of torque and/or the relative velocities of the wheels. The electromagnetic lock assembly 110 includes an electromagnetic coil 112 and a movable component 114. The electromagnetic coil 112 (referred to herein as coil 112) is configured to receive a current to generate a magnetic field (referred to herein as a first magnetic field). The movable component 114 is disposed adjacent to the coil 112 and is composed at least partially of a ferrous material such that the first magnetic field applies a magnetic force on the movable component 114 depending on the strength of the magnetic field. The magnetic force is configured to move the movable component 114 axially towards and/or away from one or more gears 104 of the differential system 102. In one or more embodiments, the movable component 114 is a plate or disk that is generally planar, and is referred to herein as a locking ring 114.

The position sensing system 100 includes the electromagnetic lock assembly 110 of the differential system 102 and a sensor assembly 118. The sensor assembly 118 is configured to monitor the position of the locking ring 114. The sensor assembly 118 is configured to transmit electrical signals representative of the position of the locking ring 114 to a remote device or control system (not shown). The position of the locking ring 114 may be used to determine or verify a present configuration of the differential system 102, to determine whether maintenance to the differential system 102 is suggested or required, or the like. For example, the sensor assembly 118 may detect changes in the way the locking ring 114 moves, such as the extent of the movement in one direction or the speed of the movement compared to how the locking ring 114 used to move in the past. This information may be used to indicate whether maintenance is suggested or required.

The sensor assembly 118 is mounted on or proximate to the electromagnetic lock assembly 110. In the illustrated embodiment, the sensor assembly 118 is mounted to a cover 120 of the electromagnetic lock assembly 110 that surrounds the coil 112. In FIG. 1, a portion of the cover 120 is shown as being removed to display the coil 112 within the cover 120. The sensor assembly 118 is mounted indirectly to the cover 120 via a connector body 122 that connects to the cover 120 to supply current to the coil 112. In other embodiments, the sensor assembly 118 may be mounted to the cover 120 directly, may be mounted to the case 106, or may be mounted to a panel or device that is separate from the differential system 102 but proximate to the electromagnetic lock assembly 110.

Figure 2:
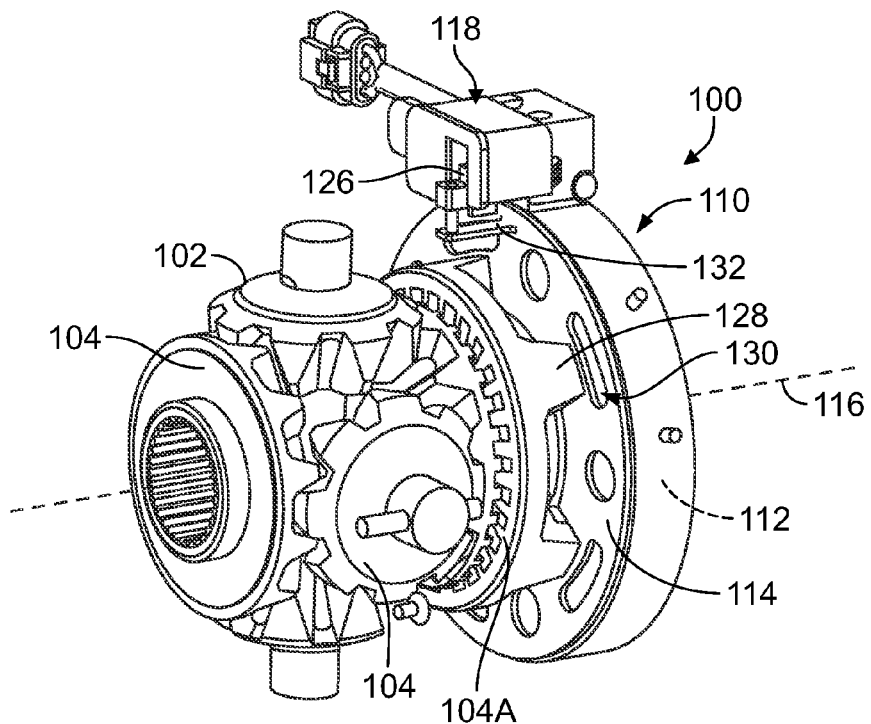
FIG. 2 is a right perspective view of the position sensing system on the mechanical device according to an embodiment.

FIG. 2 is a right perspective view of the position sensing system 100 on the mechanical device 102 according to an embodiment. In FIG. 2, the case 106 is removed from the differential system 102 to better show the gears 104 within the case 106. The locking ring 114 is configured to move linearly along a locking axis 116 between an advanced position and a retracted position relative to the coil 112. The retracted position is the closest (for example, most proximate) position of the locking ring 114 relative to the coil 112 along the path traversed by the locking ring 114. The locking ring 114 is in the retracted position in the illustrated embodiment. The advanced position is the farthest (for example, most distal) position of the locking ring 114 relative to the coil 112 along the path. The movement of the locking ring 114 may be based at least in part on the strength of the first magnetic field generated by the coil 112. The electromagnetic lock assembly 110 may be configured such that the locking ring 114 is biased towards the retracted position and is in the retracted position until a sufficient current is supplied to the coil 112 to generate the first magnetic field with sufficient strength to move the locking ring 114 away from the retracted position towards the advanced position. When the current to the coil 112 ceases or at least reduces, the strength of the first magnetic field drops and the locking ring 114 returns toward the retracted position due to a biasing force supplied by a spring or the like. Alternatively, the locking ring 114 may be biased towards the advanced position, and the generated magnetic field may pull the locking ring 114 towards the retracted position. In another embodiment, the electromagnetic coil 112 may be controlled to change the orientation of the first magnetic field such that the magnetic field pushes the locking ring 114 to the advanced position in a first field orientation and pulls the locking ring 114 to the retracted position in a second field orientation. In such an embodiment, the locking ring 114 optionally is not biased towards either of the retracted or advanced positions, since the movement in both directions is controlled by the magnetic field.

The different positions of the locking ring 114 relative to the coil 112 actuate the different configurations of the differential system 102. For example, moving the locking ring 114 away from the coil 112 to the advanced position may cause the locking ring 114 to engage a complementary one of the gears 104A to lock the differential system 102 such that the wheels attached to the differential system 102 rotate at a common velocity. Lugs 128 or other projections from the gear 104A may be received within slots 130 of the locking ring 114 when the locking ring 114 engages the gear 104A. The locking ring 114 may be rotationally fixed in place, such that the gear 104A is restricted from rotating while in engagement with the locking ring 114. Movement of the locking ring 114 towards the retracted position may cause the locking ring 114 to disengage the gear 104A to unlock the differential system 102 such that the wheels are not restricted to rotating at the same velocity. The sensor assembly 118 is configured to monitor the position of the locking ring 114 to determine whether the locking ring 114 is engaged with the gear 104A or not. The differential system 102 may be in a locked configuration when the locking ring 114 is engaged with the gear 104A, and may be in an unlocked configuration when the locking ring 114 does not engage the gear 104A. The sensor assembly 118 therefore may be used to determine whether the differential system 102 is in the locked or unlocked configuration.

Although the example above describes locked and unlocked configurations of the differential system 102, the movement of the locking ring 114 may alternatively control an amount of slip between the wheels (for example, in a limited slip differential system) that is between the locked configuration that prevents slip and the unlocked configuration that allows full slip. Furthermore, the locking ring 114 optionally may be configured to press against a flat surface, such as a washer or the end of a bearing or bushing, instead of engaging a gear 104.

Although the mechanical device 102 is a differential system 102 in FIG. 1, the subject matter of the position sensing system 100 described herein is not limited to use with a differential system. The position sensing system 100 may alternatively be used with transmission systems and other vehicular and non-vehicular devices that involve moving components. For example, the sensor assembly 118 may be used to monitor a position of a movable clutch that is actuated by a magnetic field.

In an exemplary embodiment, the sensor assembly 118 is configured to shield electromagnetic sensing components housed within the sensor assembly 118 from the first magnetic field generated by the coil 112 during ordinary use of the differential system 102. The shielding reduces electromagnetic interference caused by the first magnetic field, which reduces the noise in sensed electrical signals and improves the reliability and accuracy of the sensor assembly 118 to monitor the position of the locking ring 114.

The sensor assembly 118 is configured to monitor the position of the locking ring 114 by detecting a position of a sensing magnet 126 that is mechanically coupled to the locking ring 114 such that the sensing magnet 126 moves with the movement of the locking ring 114. Thus, the first magnetic field that is generated by the coil 112 forces movement of both the locking ring 114 and, by extension, the sensing magnet 126. The sensing magnet 126 may be mechanically coupled to the locking ring 114 via a linking arm 132 and one or more fasteners (not shown). The sensing magnet 126 may be a permanent dipole magnet. As described in more detail herein, the sensor assembly 118 is configured to detect the position and movement of the sensing magnet 126 based on a magnetic field (referred to herein as a second magnetic field) generated by the sensing magnet 126. The sensing magnet 126 and electrical sensing components that detect the second magnetic field are shielded by the sensor assembly 118 from electromagnetic interference caused by the first magnetic field generated by the electromagnetic coil 112.

Figures 3, 4:
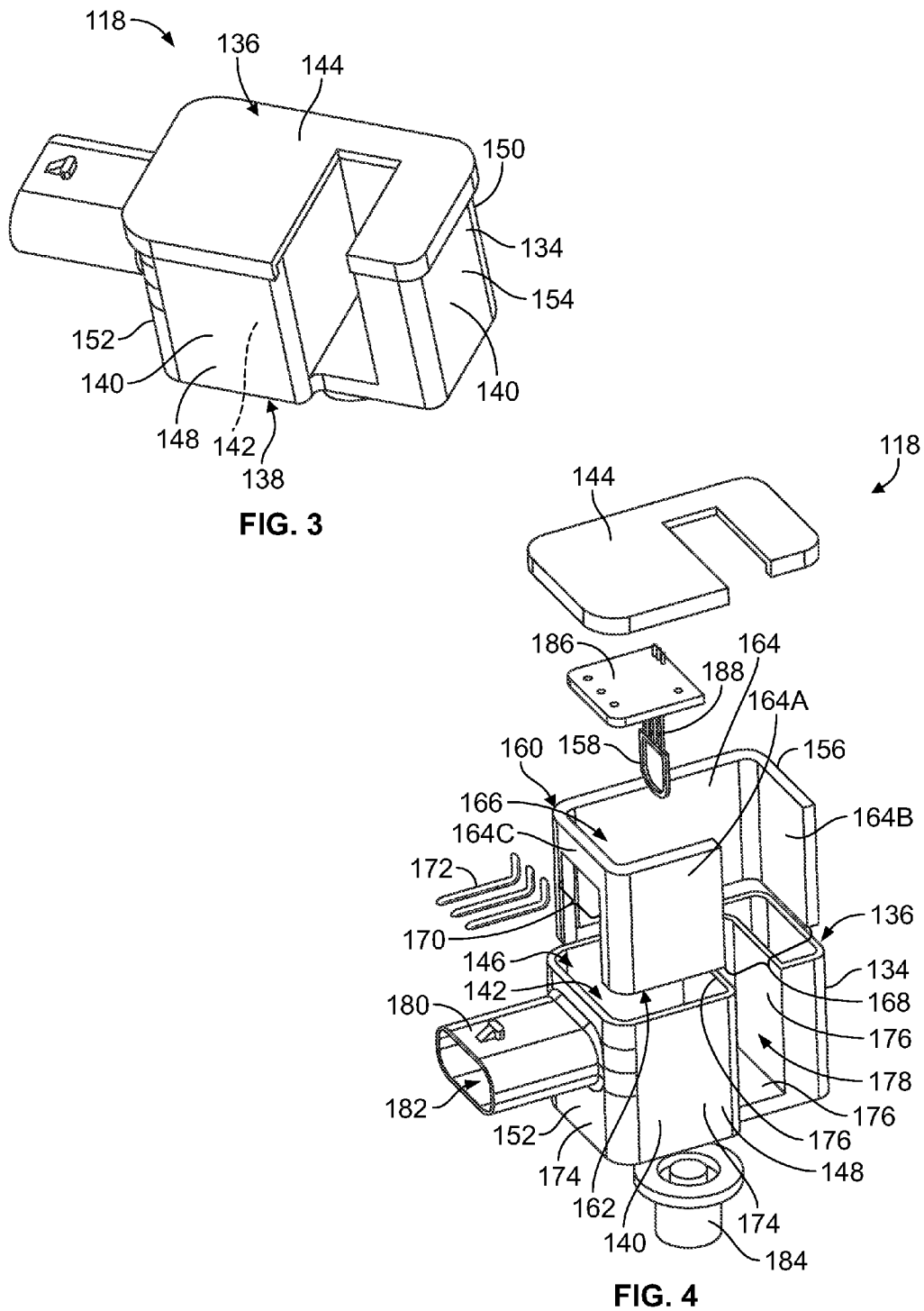
FIG. 3 is a perspective view of the sensor assembly shown without showing a sensing magnet of the sensor assembly.
FIG. 4 is an exploded perspective view of the sensor assembly shown without the sensing magnet.

FIG. 3 is a perspective view of the sensor assembly 118 shown without the sensing magnet 126. The sensor assembly 118 includes a housing 134 that extends between a front 136 and a rear 138. The housing 134 includes walls 140 that extend between the front 136 and the rear 138. The walls 140 of the housing 134 define a closed cavity 142. A lid 144 covers an opening 146 (shown in FIG. 4) at the front 136 of the housing 134. The housing 134 further defines a bottom side 148, a top side 150, a left side 152, and a right side 154. As used herein, relative or spatial terms such as "top," "bottom," "front," "rear," "first," "second," "left," and "right" are only used to distinguish the referenced elements and do not necessarily require particular positions or orientations in the sensor assembly 118 relative to gravity or in the surrounding environment of the sensor assembly 118.

FIG. 4 is an exploded perspective view of the sensor assembly 118 shown without the sensing magnet 126. In addition to the housing 134, the lid 144, and the sensing magnet 126 (shown in FIG. 1), the sensor assembly 118 includes a shield member 156 and a magnetic field sensor 158. The shield member 156 extends from a first end 160 to a second end 162. The shield member 156 may include at least three walls 164 that each extend from the first end 160 to the second end 162. The shield member 156 defines a shielded chamber 166 between the at least three walls 164. The magnetic field sensor 158 and the sensing magnet 126 are disposed within the shielded chamber 166 after assembling the sensor assembly 118. The shield member 156 is composed of a ferrous metal material, such as a metal or metal alloy containing iron. For example, the shield member 156 may be formed of mild steel, carbon steel, ferritic stainless steel, martensitic stainless steel, or the like.

The ferrous metal material of the shield member 156 allows the shield member 156 to shield the magnetic field sensor 158 and the sensing magnet 126 (shown in FIG. 2) from the first magnetic field generated by the electromagnetic coil 112 (shown in FIG. 1). The ferrous walls 164 of the shield member 156 attract the first magnetic field such that the magnetic field lines extend through the shield member 156 from the first end 160 to the second end 162 or vice-versa, depending on the direction of current through the coil 112. For example, the first magnetic field may be routed along or across the walls 164 of the shield member 156 instead of, or to a significantly greater extent than, being routed through the shielded chamber 166. As a result of the first magnetic field being routed around the shielded chamber 166, the magnetic field sensor 158 and the sensing magnet 126 within the shielded chamber 166 experience less interference attributable to the first magnetic field. Although the first magnetic field is described as being routed along a path defined by the walls 164 of the shield member 156, it is recognized that magnetic fields do not physically move or flow like electric current and the reference to such movement is for descriptive purposes only to describe the direction of the magnetic field lines of the first magnetic field that interact with the sensor assembly 118.

The shield member 156 may have a generally rectangular, elliptical, circular, triangular, or like cross-sectional shape taken through the walls 164. In the illustrated embodiment, the shield member 156 has four walls 164 that define a rectangular shape having rounded corners, but the shield member 156 may have various other shapes in other embodiments. One of the walls 164 may define a first open segment 168 in the wall 164 that extends a length at least partially between the first end 160 and the second end 162. The open segment 168 provides access to the shielded chamber 166 for the sensing magnet 126 (shown in FIG. 2). In the illustrated embodiment, the first open segment 168 extends through a bottom wall 164A of the shield member 156. The first open segment 168 extends the full length of the shield member 156 between the first and second ends 160, 162 such that the shield member 156 is not continuous across the open segment 168. For example, the bottom wall 164A in the illustrated embodiment does not extend across the first open segment 168 and does not connect to a right wall 164B of the shield member 156. The shield member 156 also defines a second open segment 170 along a left wall 164C of the shield member 156, which allows electrical conductors 172 to extend from the shielded chamber 166 for electrical termination to a mating connector (not shown), a cable harness, or an electrical device. In the illustrated embodiment, the second open segment 170 is defined in the left wall 164C from the second end 162 but does not extend fully to the first end 160, such that a portion of the left wall 164C extends across the second open segment 170. Furthermore, the shield member 156 in an embodiment is open at both the first end 160 and the second end 162. In an alternative embodiment, the shield member 156 may include a wall along the second end 162 between the walls 164 and/or a wall along the first end 160 between the walls 164 such that the second end 162 and/or the first end 160 are at least partially closed.

In an embodiment, the housing 134 and the lid 144 are both formed of dielectric materials, such as one or more plastics or other polymers. For example, one or both of the housing 134 and the lid 144 may be formed of nylon. The housing 134 and the lid 144 are non-conductive and non-magnetic and so do not interact with the first and second magnetic fields generated by the coil 112 (shown in FIG. 1) and the sensing magnet 126 (shown in FIG. 2), respectively. The walls 140 of the housing 134 include outer walls 174 and interior walls 176. The closed cavity 142 is defined by the outer walls 174 and the interior walls 176 and is not exposed to the external environment after assembly of the sensor assembly 118. Although the housing 134 defines an opening 146 at the front 136, the lid 144 seals the opening 146 during assembly. Therefore, the magnetic field sensor 158 and the shield member 156 within the closed cavity 142 may be generally protected from contaminants, moisture, heat, and other harsh conditions. The interior walls 176 define an open cavity 178 that is exposed to the external environment. The outer walls 174 do not define the open cavity 178. The open cavity 178 is a recessed portion of the housing 134 that is defined along the front 136 and the bottom side 148. The open cavity 178 provides a lane for movement of the sensing magnet 126 along a linear path of the sensing magnet 126, as described further herein. The sensing magnet 126 within the open cavity 178 is exposed to external conditions, such as oil, water, dirt and other contaminants, high temperatures, and the like.

The housing 134 optionally may include a mating interface 180 that extends from the left side 152. The mating interface 180 is a projection that defines a socket 182 that is configured to receive mating contacts (not shown) of a mating connector therein to electrically connect the mating connector to the sensor assembly 118. The mating interface 180 is configured to engage a housing of the mating connector to mechanically secure the mating connector to the sensor assembly 118. In another embodiment, the mating interface 180 may extend from a different side of the housing 134, such as the right side 154. In yet another embodiment, instead of a mating interface 180 that projects from the housing 134, the housing 134 may define a port opening along one of the sides that is configured to allow wires, cables, or other conductors to extend externally from the closed cavity 142 of the housing 134 for remote electrical termination to a mating connector, an electrical device, or the like (instead of electrically terminating within the mating interface 180).

The sensor assembly 118 is mounted to a structure to secure the sensor assembly 118 in place relative to the mechanical device 102 (shown in FIG. 1). The sensor assembly 118 may be mounted by a shaft, a fastener, or the like. In the illustrated embodiment, the bushing 184, such as a compression limiter, is used to secure the housing 134 to the structure. The bushing 184 may be formed of a non-magnetic metal material, such a non-ferrous austenitic stainless steel (for example, grade 304). As shown in FIG. 1, the structure may be the connector body 122 of the electromagnetic lock assembly 110.

The magnetic field sensor 158 is configured to detect the position of the sensing magnet 126 (shown in FIG. 2) by detecting an electrical characteristic based on the second magnetic field generated by the sensing magnet 126. For example, the magnetic field sensor 158 may detect the effect of the second magnetic field on an electrical current through the magnetic field sensor 158, and may determine the changing positions of the sensing magnet 126 based on changes in how the second magnetic field affects the electrical current. The electrical characteristic based on the second magnetic field may be a measured voltage, electrical potential, current, or the like. The magnetic field sensor 158 is configured to generate an electrical signal representative of the measured electrical characteristic, which may be transmitted to a processing unit. In the illustrated embodiment, the magnetic field sensor 158 is a Hall effect sensor (for example, linear or three-dimensional), but the magnetic field sensor 158 may be another magnetic sensor, such as a magnetoresistance-based sensor, a fluxgate magnetometer, or the like, in another embodiment.

The magnetic field sensor 158 is electrically terminated to a printed circuit board 186 via one or more conductive leads 188. The printed circuit board 186 may receive the electrical signals representative of the electrical characteristic based on the second magnetic field from the magnetic field sensor 158 and may also convey electrical current in the form of power and/or data signals to the magnetic field sensor 158. The printed circuit board 186 is housed within the closed cavity 142 of the housing 134 and within the shielded chamber 166 of the shield member 156. In the illustrated embodiment, three conductors 172 are configured to be terminated to the printed circuit board 186. The conductors 172 are terminals that extend into the mating interface 180 to engage and electrically connect to the mating contacts of the mating connector. The terminals 172 may be formed of brass or another electrically conductive metal. The terminals 172 optionally may be plated by silver or another conductive metal. In an alternative embodiment, the conductors 172 may be wires or cables that extend remotely from the sensor assembly 118.

Figure 5:
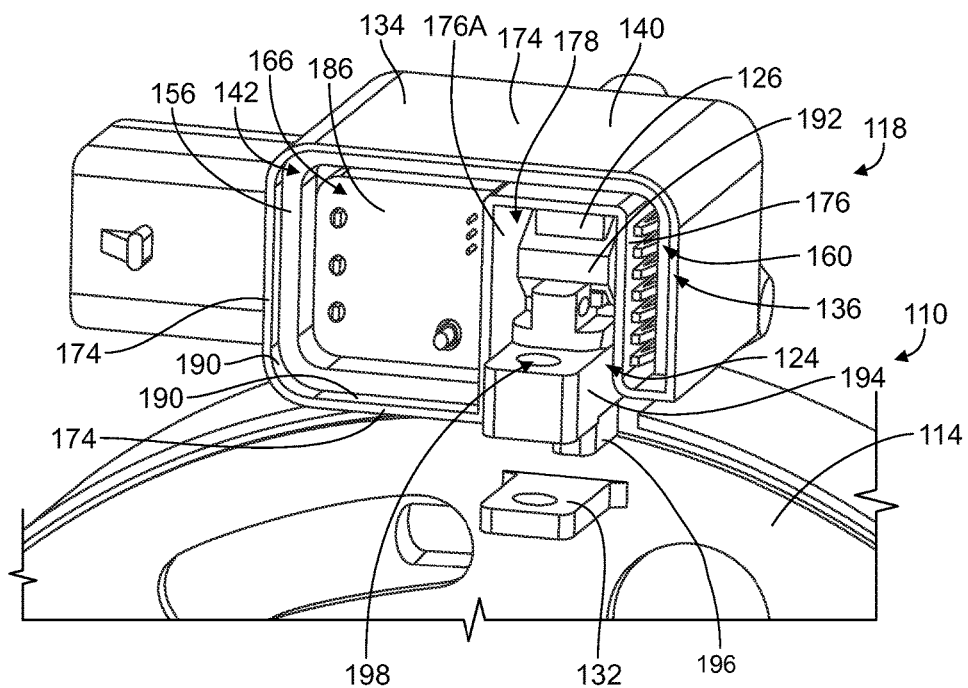
FIG. 5 is a front perspective view of the sensor assembly and a portion of an electromagnetic lock assembly according to an embodiment.

FIG. 5 is a front perspective view of the sensor assembly 118 and a portion of the electromagnetic lock assembly 110 according to an embodiment. The sensor assembly 118 is shown without the lid 144 to show the components within the closed cavity 142. The sensor assembly 118 is assembled by loading the shield member 156 and the printed circuit board 186 with integrated magnetic field sensor 158 (shown in FIG. 6) into the closed cavity 142 of the housing 134. The shield member 156 extends along inner surfaces 190 of the outer walls 174 of the housing 134. For example, the shield member 156 is disposed proximate to and may engage at least some of the outer walls 174. The shield member 156 may have a shape that generally aligns with the outer walls 174 of the housing 134. The first end 160 of the shield member 156 is disposed proximate to the front 136 of the housing 134, and, although not shown in FIG. 5, the second end 162 of the shield member 156 is proximate to the rear 138 of the housing 134. The printed circuit board 186 and the magnetic field sensor 158 are disposed within the shielded chamber 166 of the shield member 156. The printed circuit board 186 is secured to the housing 134 and/or the shield member 156 to prohibit movement of the magnetic field sensor 158 relative thereto.

As shown in FIG. 5, the sensing magnet 126 of the sensor assembly 118 is located within the open cavity 178 of the housing 134. The sensing magnet 126 does not mechanically engage the walls 140 of the housing 134 (including the interior walls 176 and the outer walls 174), such that the movement of the sensing magnet 126 is not restricted by the housing 134. The sensing magnet 126 in the open cavity 178 is separated from the printed circuit board 186 and the magnetic field sensor 158 (shown in FIG. 6) in the closed cavity 142 by one of the interior walls 176A of the housing 134. The sensing magnet 126 may be a permanent dipole magnet.

In an embodiment, the sensing magnet 126 is a component of a magnet assembly 124. The magnet assembly 124 further includes a dielectric holder 192 that engages and at least partially surrounds the sensing magnet 126 and a mounting arm 194 that is fixed to the dielectric holder 192. For example, a projection 196 of the dielectric holder 192 may extend through the mounting arm 194 to couple the dielectric holder 192 to the mounting arm 194. Alternatively, the mounting arm 194 may include a projection that extends into the dielectric holder 192. The mounting arm 194 is composed of a non-ferrous metal material, such as austenitic stainless steel (for example, grade 304). At least a substantial portion of the magnet assembly 124 is disposed within the shielded chamber 166 of the shield member 156. The mounting arm 194 extends laterally (for example, in a frontward direction) from the shielded chamber 166 of the shield member 156 and from the open cavity 178 of the housing 134. The mounting arm 194 defines an aperture 198 that is configured to receive a fastener (not shown), such as a bolt, to couple the magnet assembly 124 to the linking arm 132 of the locking ring 114. Alternatively, the linking arm 132 may include a post that is received in the aperture 198, instead of using a discrete fastener, or the linking arm 132 may receive a post that protrudes from the mounting arm 194 of the magnet assembly 124.

Figure 6:
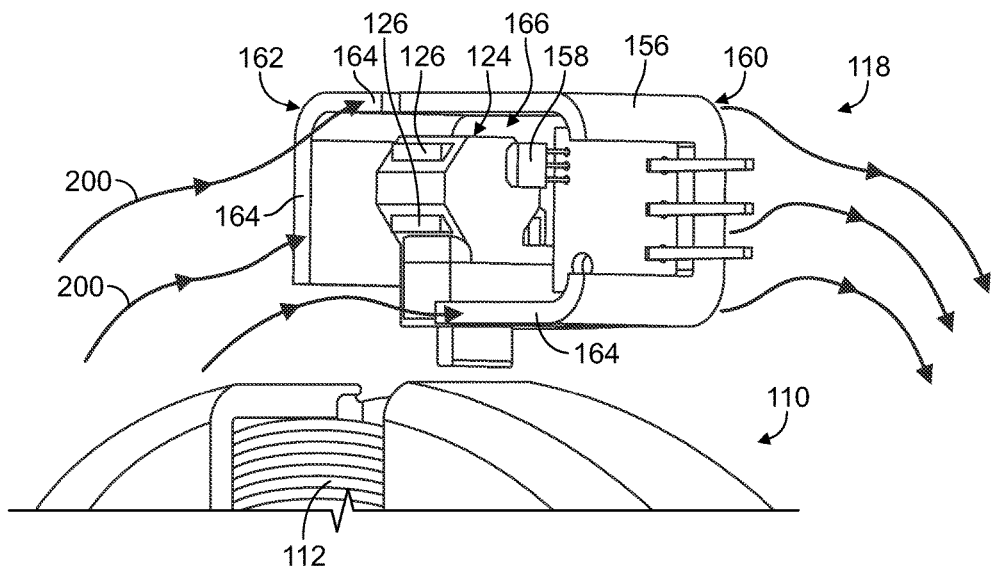
FIG. 6 is a rear perspective view of the sensor assembly and a portion of the electromagnetic lock assembly according to an embodiment.

FIG. 6 is a rear perspective view of the sensor assembly 118 and a portion of the electromagnetic lock assembly 110 according to an embodiment. The sensor assembly 118 is shown without the housing 134 and the lid 144. As shown in FIG. 6, the magnetic field sensor 158 and the sensing magnet 126 of the magnet assembly 124 are located within the shielded chamber 166 of the shield member 156. The magnetic field sensor 158 is proximate to the sensing magnet 126, although, as shown in FIG. 5, the interior wall 176A of the housing 134 extends between the magnetic field sensor 158 and the sensing magnet 126. The magnetic flux of the second magnetic field penetrates the interior wall 176A and is detected by the magnetic field sensor 158. The shield member 156 directs the first magnetic field generated by the electromagnetic coil 112 along the walls 164 of the shield member 156 from the first end 160 to the second end 162 or from the second end 162 to the first end 160. The ferrous material of the shield member 156 attracts the first magnetic field to reduce or eliminate the amount of magnetic flux of the first magnetic field that enters the shielded chamber 166, which shields the magnetic field sensor 158 and the sensing magnet 126 from the first magnetic field. The arrows 200 represent magnetic field lines of the first magnetic field. As shown in FIG. 6, the magnetic field lines 200 bend from an original trajectory or vector towards the walls 164 of the shield member 156 at the second end 162. The magnetic field lines 200 bend from the walls 164 back to the original trajectory or vector at the first end 160. Thus, at least some of the magnetic flux of the first magnetic field that would have impinged on the magnetic field sensor 158 is routed around the shielded chamber 166 instead of entering the shielded chamber 166.

Figure 7:
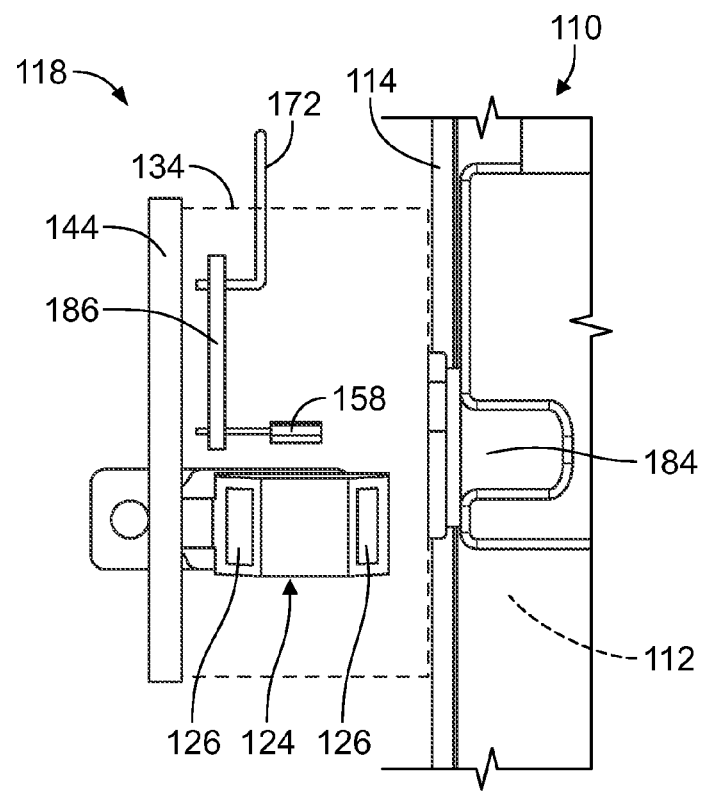
FIG. 7 is a simplified top-down view of the sensor assembly and the electromagnetic lock assembly at one position according to an embodiment.
Figure 8:
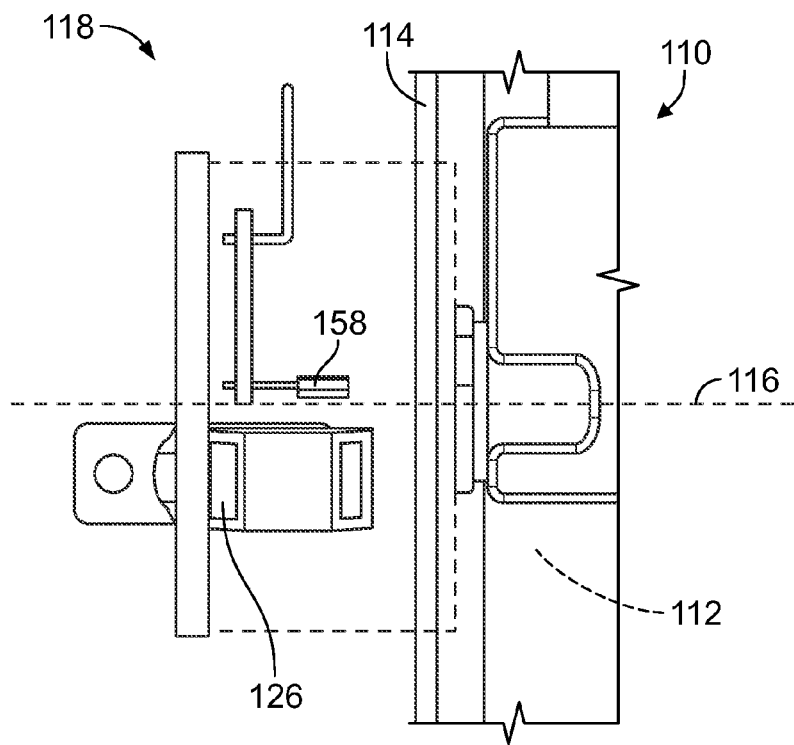
FIG. 8 is a simplified top-down view of the sensor assembly and the electromagnetic lock assembly at another position according to an embodiment.
Figure 9:
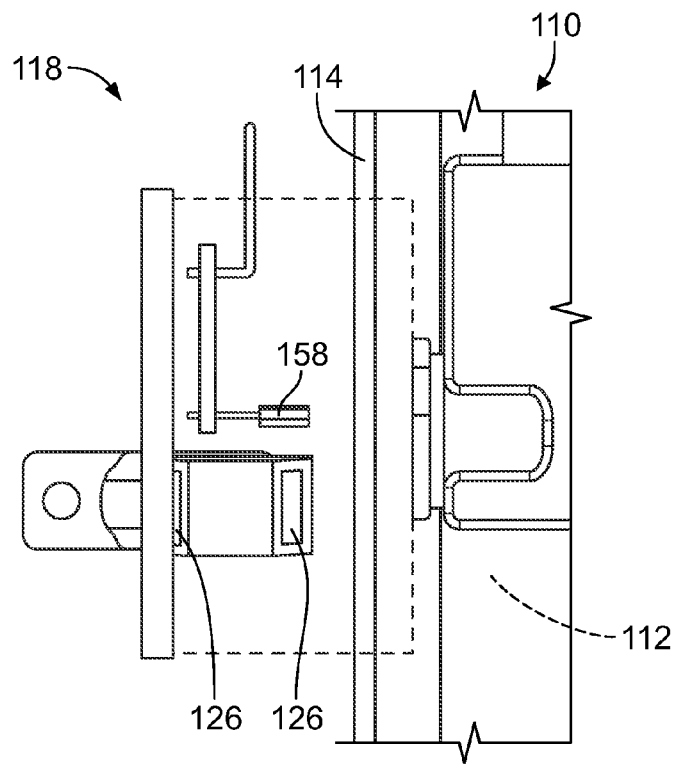
FIG. 9 is a simplified top-down view of the sensor assembly and the electromagnetic lock assembly at a third position according to an embodiment.

FIGS. 7-9 show simplified top-down views of the sensor assembly 118 and the electromagnetic lock assembly 110 at various positions according to an embodiment. The housing 134 of the sensor assembly 118 is shown in phantom, while the lid 144, the magnetic field sensor 158, the magnet assembly 124, the printed circuit board 186, the conductors 172, and the bushing 184 are displayed. The magnet assembly 124 is coupled to the locking ring 114 such that the sensing magnet 126 moves with the movement of the locking ring 114, although the linking arm 132 (shown in FIG. 2) of the locking ring 114 that mechanically couples the magnet assembly 124 to the locking ring 114 is not shown. FIG. 7 shows the locking ring 114 in the retracted position relative to the electromagnetic coil 112. When the locking ring 114 is in the retracted position, the sensing magnet 126 of the magnet assembly 124 is in a first position relative to the magnetic field sensor 158. The magnetic field sensor 158 measures a first electrical characteristic based on the magnetic field generated or emitted by the sensing magnet 126 in the first position. The first electrical characteristic may be a voltage, a current, an electrical potential, or the like.

FIG. 8 shows the locking ring 114 in an intermediate position relative to the coil 112. The intermediate position is between the retracted and advanced positions. The locking ring 114 in the intermediate position shown in FIG. 8 may be roughly halfway between the retracted and advanced positions. The locking ring 114 may be moved from the retracted position to the intermediate position based on the first electric field generated by the coil 112 upon being supplied an electrical current. The locking ring 114 may in the intermediate position merely temporarily as the locking ring 114 moves linearly along the locking axis 116 from the retracted position to the advanced position, or vice-versa. When the locking ring 114 is in the intermediate position, the sensing magnet 126 is in a second position relative to the magnetic field sensor 158. The magnetic field sensor 158 measures a second electrical characteristic based on the magnetic field generated or emitted by the sensing magnet 126 in the second position. The second electrical characteristic is different than the first electrical characteristic because the sensing magnet 126 is at a different distance from the magnetic field sensor 158 at the second position relative to the first position.

FIG. 9 shows the locking ring 114 in the advanced position relative to the coil 112. When the locking ring 114 is in the advanced position, the sensing magnet 126 is in a third position relative to the magnetic field sensor 158. The magnetic field sensor 158 measures a third electrical characteristic based on the magnetic field generated or emitted by the sensing magnet 126 in the third position. Optionally, the locking ring 114 may traverse a linear path that is less than 10 mm in length. For example, the distance between the advanced position and the retracted position of the locking ring 114 may be 4 mm, such that the locking ring 114 in the intermediate position shown in FIG. 8 is roughly 2 mm from each of the advanced and retracted positions.

Figure 10:
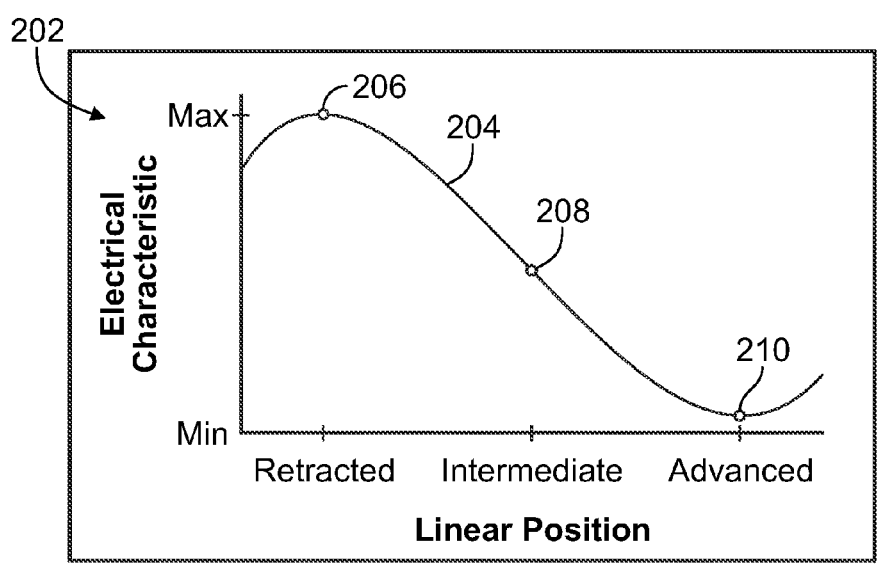
FIG. 10 is a graph that plots electrical characteristics detected by the magnetic field sensor over linear positions of a locking ring according to an embodiment.

Referring now to FIG. 10 in addition to FIGS. 7-9, FIG. 10 is a graph 202 that plots the electrical characteristics detected by the magnetic field sensor 158 based on the magnetic field generated by the sensing magnet 126 over a linear position of the locking ring 114 according to an embodiment. As shown in FIG. 10, the plot line 204 of the electrical characteristics has a sinusoidal wave form as the sensing magnet 126 is moved by the movement of the locking ring 114. Plot point 206 represents the electrical characteristic detected by the magnetic field sensor 158 when the locking ring 114 is in the retracted position; plot point 208 represents the electrical characteristic detected when the locking ring 114 is in the intermediate position; and plot point 210 represents the electrical characteristic detected when the locking ring 114 is in the advanced position.

The magnitude of the electrical characteristic is at a maximum value when the locking ring 114 is at the retracted position and is at a minimum value when the locking ring 114 is at the advanced position. This trend may be attributable to the magnetic field sensor 158 being closest to a midpoint of the sensing magnet 126 when the locking ring 114 is in the retracted position and being farthest from the midpoint of the sensing magnet 126 when the locking ring 114 is in the advanced position. Proximity to the midpoint or another reference point of the sensing magnet 126, such as the positive pole or the negative pole, may affect the amount or intensity of magnetic flux that impinges upon the magnetic field sensor 158. In other embodiments, the electrical characteristics may be at a maximum when the locking ring 114 is at the advanced position or at an intermediate position, depending on how the sensing magnet 126 is held relative to the magnetic field sensor 158 and the direction of movement of the sensing magnet 126. The plot line 204 may be calibrated with measured locations of the locking ring 114 such that the position of the locking ring 114 at any location between the retracted and advanced positions may be determined using the sensor assembly 118. Due to the shield member 156 (shown in FIG. 6), interference caused by the first magnetic field generated by the electromagnetic coil 112 has a minimal or negligible effect on the position sensing operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A sensor assembly comprising:
a housing extending between a front and a rear, the housing configured to be mounted at least one of on or proximate to an electromagnetic coil configured to generate a first magnetic field to move a movable component linearly along an axis between an advanced position and a retracted position relative to the electromagnetic coil based on a strength of the first magnetic field, the housing including walls that extend between the front and the rear, the walls defining a closed cavity that is not exposed to an external environment and an open cavity that is exposed to the external environment;
a shield member disposed within the housing, the shield member defining a shielded chamber;
a sensing magnet configured to be coupled to the movable component such that the sensing magnet moves with the movable component, the sensing magnet disposed within the shielded chamber; and
a magnetic field sensor disposed within the shielded chamber, the magnetic field sensor detecting an electrical characteristic responsive to a second magnetic field produced by the sensing magnet to monitor a position of the movable component along the axis,
wherein the shield member and the magnetic field sensor are disposed within the closed cavity of the housing and the sensing magnet is disposed within the open cavity, and wherein the shield member is composed of a ferrous material to shield the magnetic field sensor and the sensing magnet from the first magnetic field generated by the electromagnetic coil.

2. The sensor assembly of claim 1, wherein the walls of the housing include outer walls and interior walls, the open cavity being defined by the interior walls and not the outer walls, one of the interior walls extending between the sensing magnet that is within the open cavity and the magnetic field sensor that is within the closed cavity.

3. The sensor assembly of claim 2, wherein the shield member extends along inner surfaces of the outer walls.

4. The sensor assembly of claim 1, wherein the magnetic field sensor is terminated to a printed circuit board disposed within the shielded chamber of the shield member.

5. The sensor assembly of claim 1, wherein the shield member defines at least three walls that each extend from a first end of the shield member at the front of the housing to a second end of the shield member at the rear of the housing, at least one of the first end or the second end being open, the shielded chamber defined between the at least three walls.

6. The sensor assembly of claim 1, wherein the electrical characteristic responsive to the second magnetic field is at least one of a current, voltage, or electrical potential induced by the second magnetic field at the magnetic field sensor, a magnitude of the at least one of current, voltage, or electrical potential being dependent on a position of the sensing magnet relative to the magnetic field sensor.

7. A sensor assembly comprising:
a housing extending between a front and a rear, the housing configured to be mounted at least one of on or proximate to an electromagnetic coil configured to generate a first magnetic field to move a movable component linearly along an axis between an advanced position and a retracted position relative to the electromagnetic coil based on a strength of the first magnetic field;
a shield member disposed within the housing, the shield member defining a shielded chamber;
a magnet assembly including a sensing magnet, a dielectric holder that engages and at least partially surrounds the sensing magnet and a mounting arm that is fixed to the dielectric holder, the mounting arm being composed of a non-ferrous metal material, the mounting arm extending from the housing and coupling to the movable component via a mechanical fastener to couple the sensing magnet to the movable component such that the sensing magnet moves with the movable component, the sensing magnet disposed within the shielded chamber; and
a magnetic field sensor disposed within the shielded chamber, the magnetic field sensor detecting an electrical characteristic responsive to a second magnetic field produced by the sensing magnet to monitor a position of the movable component along the axis, wherein the shield member is composed of a ferrous material to shield the magnetic field sensor and the sensing magnet from the first magnetic field generated by the electromagnetic coil.

8. The sensor assembly of claim 7, wherein the housing includes walls that define a closed cavity that is not exposed to an external environment and an open cavity that is exposed to the external environment, wherein the shield member and the magnetic field sensor are disposed within the closed cavity of the housing, and the sensing magnet is disposed within the open cavity.

9. The sensor assembly of claim 7, wherein the walls of the housing include outer walls and interior walls, one of the interior walls extending between the sensing magnet and the magnetic field sensor such that the sensing magnet and the magnetic field sensor are on opposite sides of the one interior wall.

10. A position sensing system comprising:
an electromagnetic lock assembly including an electromagnetic coil and a locking ring, the electromagnetic coil being configured to receive a current to generate a first magnetic field, the locking ring moving linearly along a locking axis between an advanced position and a retracted position relative to the electromagnetic coil based on a strength of the first magnetic field; and
a sensor assembly mounted on or proximate to the electromagnetic lock assembly, the sensor assembly including a housing, a shield member, a magnetic field sensor, and a sensing magnet, the housing including walls that define a closed cavity that is not exposed to an external environment and an open cavity that is exposed to the external environment, the sensing magnet being coupled to the locking ring and movable with the movement of the locking ring, the shield member defining a shielded chamber, the magnetic field sensor and the sensing magnet disposed within the shielded chamber, the magnetic field sensor detecting an electrical characteristic responsive to a second magnetic field produced by the sensing magnet to monitor a position of the locking ring along the locking axis,
wherein the shield member and the magnetic field sensor are disposed within the closed cavity of the housing, and the sensing magnet is disposed within the open cavity, wherein the shield member is composed of a ferrous material to shield the magnetic field sensor and the sensing magnet from the first magnetic field generated by the electromagnetic coil.

11. The position sensing system of claim 10, wherein the walls of the housing include outer walls and interior walls, the interior walls defining the open cavity, wherein one of the interior walls extends between the sensing magnet and the magnetic field sensor that is within the closed cavity.

12. The position sensing system of claim 10, wherein the sensing magnet does not mechanically engage the walls of the housing.

13. The position sensing system of claim 10, wherein the shield member defines at least three walls that each extend from a first end of the shield member to a second end of the shield member, at least one of the first end or the second end being open, the shielded chamber defined between the at least three walls.

14. The position sensing system of claim 13, wherein one wall of the at least three walls defines an open segment through the respective wall for a length extending at least partially between the first end and the second end, the open segment providing access to the shielded chamber for the sensing magnet.

15. The position sensing system of claim 10, wherein the sensor assembly is mounted to a cover of the electromagnetic lock assembly that surrounds the electromagnetic coil.

16. The position sensing system of claim 10, wherein the sensing magnet is a component of a magnet assembly, the magnet assembly further including a dielectric holder that engages and at least partially surrounds the sensing magnet and a mounting arm that is fixed to the dielectric holder, the mounting arm being composed of a non-ferrous metal material, the mounting arm extending from the shield member and coupling to the locking ring via a mechanical fastener to couple the sensing magnet to the locking ring.

17. The position sensing system of claim 10, wherein the magnetic field sensor is terminated to a printed circuit board disposed within the shielded chamber.

18. The position sensing system of claim 10, wherein the housing includes a mating interface that extends from one of the walls, the mating interface defining a socket, the sensor assembly including plural terminals within the socket that are electrically connected to the magnetic field sensor, the terminals configured to engage a mating connector to electrically connect the sensor assembly to the mating connector.

19. The position sensing system of claim 10, wherein the electrical characteristic responsive to the second magnetic field is at least one of a current, voltage, or electrical potential induced by the second magnetic field at the magnetic field sensor, a magnitude of the at least one of current, voltage, or electrical potential being dependent on a position of the sensing magnet relative to the magnetic field sensor.

20. The position sensing system of claim 10, wherein the electromagnetic lock assembly is a component of a differential system for a vehicle.

* * * * *